UNITED STATES PATENT OFFICE.

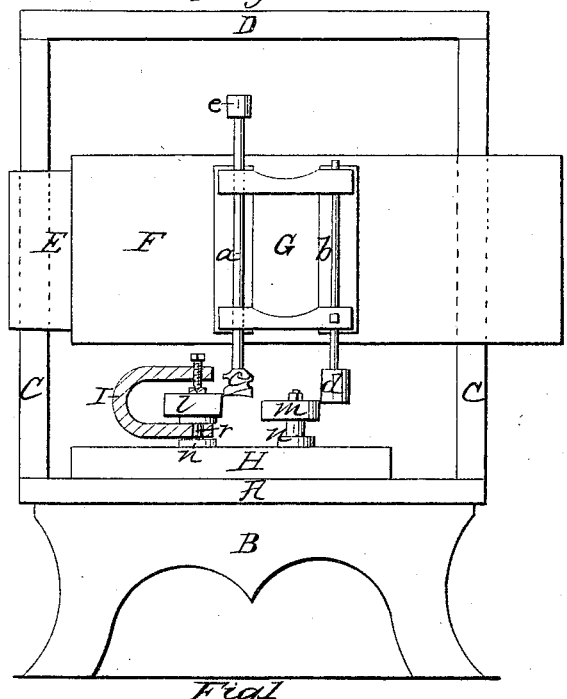
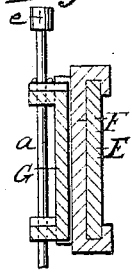
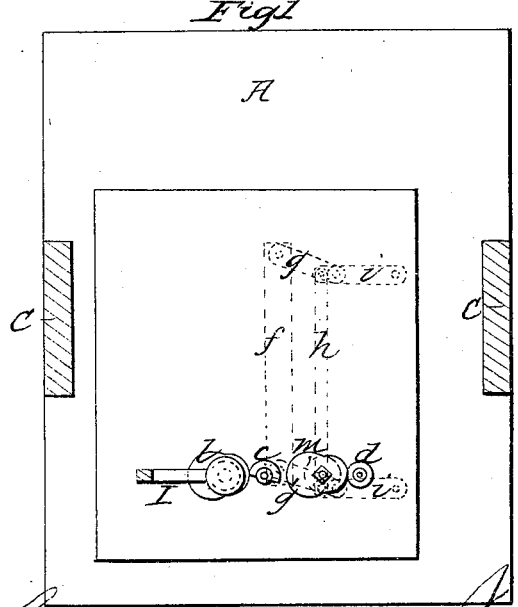

JOHN DANE, JR., OF NEWARK, NEW JERSEY, ASSIGNOR TO W. J. DUDLEY AND W. U. DUDLEY, OF NEW YORK, N. Y.

IMPROVEMENT IN MACHINE FOR SHAPING WOOD.

Specification forming part of Letters Patent No. 55,006, dated May 22, 1866; antedated May 16, 1866.

*To all whom it may concern:*

Be it known that I, JOHN DANE, Jr., of Newark, in the county of Essex and State of New Jersey, have invented certain new and useful Improvements in Wood-Shaping Machines; and I do hereby declare that the following is a full, clear, and exact description of the same, reference being had to the accompanying drawings, forming a part of this specification, in which—

Figure 1 is a horizontal section of my improved wood-shaping machine. Fig. 2 is a front elevation of the same, with a rotating vise, which constitutes a part of my invention, in section. Fig. 3 is a vertical transverse section of the horizontal sliding cross-head of the machine and a vertically-adjustable cutter-frame attached thereto.

Similar letters indicate corresponding parts of the machine in the several figures of the drawings.

This invention relates to that class of wood-shaping machines in which the work and a pattern are arranged upon a flat table or carriage and the cutter and a tracer are arranged in a frame moving in planes perpendicular to said table or carriage.

A great difficulty heretofore existing in such machines has been that the vise or clamp by which the work was held would not permit the cutter to pass entirely around the work. The object of this invention is to overcome this difficulty and provide for the finishing of each piece of work around its entire circumference or perimeter without changing its position, which I accomplish in a very simple way by arranging the vise or clamp in such a manner that it can revolve or rotate around the piece, while at the same time it firmly gripes and holds it in the desired position during the process of its being shaped.

The invention further relates to the arrangement of the frame which carries the cutter and tracer in relation to a universally-movable table, on which the work is placed.

To enable others skilled in the art to make and use my invention, I will now describe its construction and operation with reference to the drawings.

A is a table, which is supported upon a frame, B, of a suitable height. Two standards, C C, are firmly secured to the said table A, one on each side, and these are connected at the upper ends by means of a brace, D, Fig. 2, so as to give additional firmness to the structure.

E is a piece extending across the table from one standard to the other, and firmly attached at each end to one of the said standards C at about the center of their height. A cross-head, F, Figs. 2 and 3, is fitted to slide horizontally on this piece E and crosswise of the table A, and this cross-head F is fitted centrally with a vertically-adjustable frame, G, Figs. 2 and 3, into which the revolving cutter-spindle $d$ and the tracer-spindle $b$, Figs. 2 and 3, are properly fitted.

$c$, Figs. 1 and 2, is a cutter, and $d$ is the tracer, both of which should be of equal diameter.

$e$, Figs. 2 and 3, is a pulley on the cutter-spindle $a$, around which is to be placed a belt, by means of which the said cutter $c$ is to be operated.

H, Figs. 1 and 2, is a universally-movable carriage placed upon the table A and attached thereto by means of mechanism which allows the said carriage H to be moved in any direction, either sidewise, endwise, diagonally, circularly, or in any direction that may be required, while the sides of the carriage H always remain parallel with the sides of the table A. This mechanism is constructed in the following manner: An oblong piece, $f$, Fig. 1, of proper dimensions, is firmly secured to the table A in such a manner that the sides of the said piece are parallel with the sides of the table A. Two pieces, $g\ g$, Fig. 1, of equal length, are pivoted each at one end to the ends of the piece $f$. The other ends of the said pieces $g\ g$ are pivoted to the end of a movable piece, $h$, of the same length as the piece $f$. Two pieces, $i\ i$, Fig. 1, of equal length, corresponding with the pieces $g\ g$, are furthermore pivoted each at one end to the ends of the movable piece $h$, in juxtaposition to the ends of the pieces $g\ g$, and the other ends of the said pieces $i\ i$, Fig. 1, are jointed to the carriage H, at one side thereof, in such a manner that the said pieces $i\ i$ are parallel with each other. This mechanism is contained within a cavity in the bottom of the carriage H.

I, Figs. 1 and 2, is a vise or screw-clamp by means of which the wood to be shaped is held. This vise is constructed in such a manner that it can rotate around a stationary support, K, Figs. 1 and 2, by which it is held and upon which the wood to be shaped is placed. This wood is represented in red lines at *t*, Figs. 1 and 2.

*m*, Figs. 1 and 2, is the pattern according to which the wood is to be shaped. This is bolted to a stationary support, *n*, Figs. 1 and 2. The supports *k* and *n*, Fig. 2, are firmly attached to the top of the carriage H, and their distance from each other should be equal to the distance between the center of the cutter-spindle *a* and the tracer *b*, Fig. 2.

The cutter *c*, Figs. 1 and 2, is made of an auger-like shape both at the upper and at the lower edge, which enables the operator to cut with it upward as well as downward or sideways. The side of said cutter may be shaped into any form which is intended it should cut.

When a piece of wood, *l*, which is to be shaped is properly secured in the vise I, Figs. 1 and 2, and the said cutter *c* is made to revolve, the carriage H should be moved so that the tracer *d* will follow the profile of the pattern *m*, Figs. 1 and 2. The said pattern is kept in contact with the tracer *d* until the pattern has been moved all around the said tracer by means of the carriage H; and as the pattern is thus kept in contact with the tracer the cutter *c*, Figs. 1 and 2, will cut away the wood and shape it exactly like the pattern. During this operation the vise I will rotate on its axis around the piece of wood, and it may be moved either by hand or by coming in contact with the cutter-spindle *a*, Fig. 2, by which it will be pushed out of the way as the work is progressing.

Having thus fully described my improvements in wood-shaping machines, what I claim therein as new, and desire to secure by Letters Patent, is—

1. The vise or clamp I, arranged to rotate upon a pivot, K, which attaches it to the table H, substantially as and for the purpose herein specified.

2. The vertically-movable frame G, carrying the revolving cutter-spindle and tracer, and the horizontally-sliding cross-head F, carrying the said frame, arranged in relation to the universally-movable table H, upon which the work is placed, substantially as herein described, to operate as set forth.

JOHN DANE, Jun.

Witnesses:
J. W. COOMBS,
G. W. REED.